United States Patent
Nishikawa et al.

(10) Patent No.: US 12,231,063 B2
(45) Date of Patent: Feb. 18, 2025

(54) POWER CONVERSION DEVICE, CONTROL DEVICE FOR POWER CONVERSION DEVICE, AND POWER CONVERSION CONTROL METHOD

(71) Applicants: FUJI ELECTRIC CO., LTD., Kawasaki (JP); KYUSHU UNIVERSITY, NATIONAL UNIVERSITY CORPORATION, Fukuoka (JP)

(72) Inventors: Yukihiro Nishikawa, Kodaira (JP); Masahito Shoyama, Fukuoka (JP); Koki Hebishima, Fukuoka (JP)

(73) Assignees: FUJI ELECTRIC CO., LTD., Kanagawa (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 197 days.

(21) Appl. No.: 18/088,963

(22) Filed: Dec. 27, 2022

(65) Prior Publication Data

US 2023/0134040 A1 May 4, 2023

Related U.S. Application Data

(63) Continuation of application No. PCT/JP2021/044931, filed on Dec. 7, 2021.

(30) Foreign Application Priority Data

Jan. 13, 2021 (JP) .................................. 2021-003242

(51) Int. Cl.
*H02M 7/537* (2006.01)
*H02M 1/08* (2006.01)
(Continued)

(52) U.S. Cl.
CPC ............. *H02M 7/537* (2013.01); *H02M 1/08* (2013.01); *H02M 3/33507* (2013.01); *H02M 1/42* (2013.01)

(58) Field of Classification Search
CPC ........ H02M 1/08; H02M 1/42; H02M 1/4241; H02M 1/4233; H02M 7/537;
(Continued)

(56) References Cited

U.S. PATENT DOCUMENTS 4,951,185 A 8/1990 Schutten et al.
2014/0355313 A1* 12/2014 Nishikawa ........ H02M 3/33507
363/17

(Continued)

FOREIGN PATENT DOCUMENTS

CN 103078492 A 5/2013
JP 2002-262569 A 9/2002
(Continued)

OTHER PUBLICATIONS

PCT/ISA/210, "International Search Report for PCT International Application No. PCT/JP2021/044931," Mar. 1, 2022.
(Continued)

*Primary Examiner* — Nguyen Tran
(74) *Attorney, Agent, or Firm* — HAUPTMAN HAM, LLP

(57) ABSTRACT

This power conversion device includes a control unit that controls a switching operation of a switching element of the inverter unit. The control unit is configured to switch between frequency modulation control and phase shift control, based on the output from the output converter unit, and execute. Then, the control unit is configured to, when switching between frequency modulation control and phase shift control, execute overlap control for executing the phase shift control while executing the frequency modulation control, in a predetermined switching operation range.

9 Claims, 9 Drawing Sheets

(51) Int. Cl.
*H02M 3/335* (2006.01)
*H02M 1/42* (2007.01)

(58) Field of Classification Search
CPC .. H02M 7/53803; H02M 7/529; H02M 7/527; H02M 7/525; H02M 7/523; H02M 7/521; H02M 7/4815; H02M 7/4826
See application file for complete search history.

(56) References Cited

U.S. PATENT DOCUMENTS

| | | | |
|---|---|---|---|
| 2015/0207419 A1 | 7/2015 | Kyono | |
| 2017/0324347 A1* | 11/2017 | Xu | H02M 3/33584 |
| 2019/0372471 A1* | 12/2019 | Peng | H02M 3/33584 |
| 2020/0287468 A1 | 9/2020 | Mizutani et al. | |

FOREIGN PATENT DOCUMENTS

| | | |
|---|---|---|
| JP | 2015-139258 A | 7/2015 |
| JP | 5928913 B2 | 6/2016 |
| JP | 2016-220347 A | 12/2016 |
| JP | 2017-038456 A | 2/2017 |
| WO | 2016185636 A1 | 11/2016 |
| WO | 2019/130395 A1 | 7/2019 |

OTHER PUBLICATIONS

PCT/ISA/237, "Written Opinion for PCT International Application No. PCT/JP2021/044931," Mar. 1, 2022.
German Office Action for German Application No. 11 2021 002 687.9 dated Nov. 8, 2024; 7pp.

* cited by examiner

POWER CONVERSION DEVICE, CONTROL DEVICE FOR POWER CONVERSION DEVICE, AND POWER CONVERSION CONTROL METHOD

CROSS-REFERENCE TO RELATED APPLICATION

This application is a continuation of PCT application PCT/JP2021/044931, filed on Dec. 7, 2021, claiming a priority of Japanese Patent Application No. 2021-003242 filed on Jan. 13, 2021, the disclosure of which is incorporated herein.

BACKGROUND OF THE INVENTION

Field of the Invention

The present invention relates to a power conversion device, a control device for a power conversion device, and a power conversion control method.

Description of the Background Art

In the related art, a control device for a resonant DC-DC converter is known. Such a control device for a resonant DC-DC converter is disclosed in Japanese Patent No. 5928913, for example.

The control device described in Japanese Patent No. 5928913 controls the operation of semiconductor switching elements in a resonant DC-DC converter including a full bridge circuit of semiconductor switching elements connected to a transformer via a series resonant circuit, and a rectifier circuit connected to the secondary winding of the transformer. The control device includes fixed frequency control means and frequency modulation control means. The control operation by the fixed frequency control means includes phase modulation control of the semiconductor switching element at the resonance frequency of the series resonant circuit. Then, the control operation by the frequency modulation control means performs frequency modulation control of the semiconductor switching element at a frequency lower than the resonance frequency. The control device described in Japanese Patent No. 5928913 determines a control amount such that the output of the resonant DC-DC converter becomes a predetermined value, based on the current and voltage output from the rectifier circuit, and controls, based on the determined control amount, the operation of the semiconductor switching element by switching between the control operation by the fixed frequency control means and the control operation by the frequency modulation control means. Then, this control amount is set based on the output current and output voltage that are output from the DC-DC converter.

Here, as in the control device described in Japanese Patent No. 5928913, by changing the control amount (command value), when controlling the operation of the semiconductor switching element by switching two controls between phase modulation control (phase shift-control) and frequency modulation control, in the vicinity of the command value at which the two controls are switched, phase shift control and frequency modulation control differ in output change (followability) with respect to change in command value. In the vicinity of the command value at which the two controls are switched, in the phase shift control, the change in the output with respect to the change in the command value is small (substantially zero), whereas in the frequency modulation control, the change in the output with respect to the change in the command value becomes relatively large. Therefore, when the command value is changed so as to switch between the two controls, at the timing when the two controls are switched, the change in the output with respect to the change in the command value changes greatly from substantially zero, and ripples occur in the output current. In this case, noise or the like may occur in an external device due to ripples (pulsating current accompanied by irregular fluctuations) included in the output current. Therefore, even when the operation of the switching element is controlled while switching between the phase shift control and the frequency modulation control, it is desired to suppress ripples in the output current.

SUMMARY OF THE INVENTION

The present invention has been made to solve the above problems, and one object of the present invention is to provide a power conversion device, a control device for a power conversion device, and a power conversion control method capable of suppressing ripples in an output current, even when controlling the operation of a switching element while switching between phase shift control and frequency modulation control.

In order to achieve the above object, a power conversion device according to a first aspect of the present invention includes: an inverter unit that includes a switching element and converts input direct current (DC) power to output alternating current (AC) power; a resonance circuit that includes a resonance capacitor connected in series to an output side of the inverter unit; a transformer that transforms the AC power that is input from the inverter unit via the resonance circuit and outputs transformed AC power; an output converter unit that converts the transformed AC power from the transformer into DC power and outputs the DC power; and a control unit that controls a switching operation of the switching element of the inverter unit, in which the control unit is configured to switch between frequency modulation control for changing a switching frequency of the switching element and phase shift control for changing a phase difference in the switching operation of the switching element, based on an output from the output converter unit, and to execute, and when switching between the frequency modulation control and the phase shift control, execute overlap control for executing the phase shift control while executing the frequency modulation control, in a predetermined switching operation range.

In the power conversion device according to the first aspect of the present invention, as described above, when switching between the frequency modulation control and the phase shift control, the overlap control for executing the phase shift control while executing the frequency modulation control is executed in a predetermined switching operation range. As a result, in an operation range in which an output change is small with respect to a command value change when phase shift control is executed, the frequency modulation control with a relatively large output change can be overlapped and executed. Therefore, in the vicinity of the command value at which the two controls are switched, it is possible to suppress the change in the output with respect to the change in the command value from becoming substantially zero, so that when the command value is changed so as to switch between the two controls, it is possible to suppress a large sudden change in the output from a substantially zero state. As a result, the change in the output with respect to the change in the command value can be smoothly changed, so that even when controlling the operations of the switching elements while switching between phase shift control and frequency modulation control, ripples in the output current can be suppressed.

In the power conversion device according to the first aspect, preferably, the control unit is configured to switch between executing only the frequency modulation control by setting the phase difference constant and executing only the phase shift control by setting the switching frequency to a constant fixed frequency, and execute the overlap control, by changing the phase difference while changing the switching frequency in the predetermined switching operation range. With this configuration, outside the predetermined switching operation range, only one of frequency modulation control and phase shift control can be executed without switching therebetween, so that it is possible to suppress the inclusion of ripples in the output current due to the switching of control. Since it is possible to switch between frequency modulation control and phase shift control while executing overlap control in a predetermined switching operation range, even in an operation range in which the frequency modulation control and the phase shift control are switched, it is possible to suppress the inclusion of ripples in the output current. Therefore, the ripples included in the output current can be suppressed, even when any one of frequency modulation control, phase shift control, and overlap control is executed.

In the power conversion device according to the first aspect, preferably, the control unit is configured to execute the frequency modulation control by setting the phase difference constant to half a period of a switching operation, and execute the overlap control by changing the switching frequency while changing the phase difference to be less than half the period of the switching operation. Here, when the phase difference in the switching operation is half the period of the switching operation, the switching operation is performed with a phase difference of 180° (opposite phase), so that as compared to the case where the phase difference is shifted from 180°, the inverter unit can efficiently perform the power conversion operation. Therefore, when frequency modulation control is executed to increase the output voltage, the output voltage can be efficiently increased by setting the phase difference constant to half the period of the switching operation. When the output voltage is reduced by switching from frequency modulation control to phase shift control, overlap control for changing the switching frequency while changing (decreasing) the phase difference to less than half the period of the switching operation is executed. Therefore, it is possible to reduce the output voltage while effectively suppressing the ripples included in the output current in a predetermined switching operation range. As a result, by switching between frequency modulation control and phase shift control while executing overlap control, it is possible to efficiently change the output voltage while suppressing current ripples caused by the switching of control.

In the power conversion device according to the first aspect, preferably, the control unit is configured to acquire a command value for setting the switching frequency and the phase difference, based on an output from the output converter unit, and execute the overlap control, in a predetermined switching operation range, when the command value is a value within a preset switching command value range. With this configuration, the command value is acquired based on the output from the output converter unit, so that control in which the output is reflected (feedbacked) can be easily executed, by controlling the switching frequency and the phase difference based on the acquired command value. In addition, when the command value for setting the switching frequency and the phase difference is within the switching command value range, it is configured to execute overlap control, so that changing the switching frequency, changing the phase difference, and executing the overlap control can be executed by a common command value. Therefore, the processing load can be reduced as compared to the case where changing the switching frequency, changing the phase difference, and executing the overlap control are executed by separate control processes.

In this case, preferably, the control unit is configured to set the switching frequency when the acquired command value is a minimum value of the switching command value range, to be a resonance frequency of the resonance circuit, and when the acquired command value is a value within the switching command value range, the control unit is configured to set the switching frequency to a frequency equal to or lower than the resonance frequency, and execute the overlap control. With this configuration, since the maximum value of the switching frequency in the overlap control is the switching frequency in the phase shift control, by setting the switching frequency to a frequency equal to or lower than the resonance frequency and performing the overlap control, the switching frequency when performing the phase shift control can be set to the resonance frequency. Therefore, since the phase shift control can be executed without increasing the switching frequency more than necessary, it is possible to suppress an unnecessary increase in the number of switching operations. As a result, when performing phase shift control, it is possible to suppress a decrease in power conversion efficiency due to a large number of switching operations.

In the power conversion device configured to acquire the command value based on the output from the output converter unit, preferably, the control unit is configured to set the switching frequency when the acquired command value is a maximum value of the switching command value range, to be a resonance frequency of the resonance circuit, and when the acquired command value is a value within the switching command value range, the control unit is configured to set the switching frequency to a frequency equal to or greater than the resonance frequency, and execute the overlap control. With this configuration, since the switching frequency when the command value is the maximum value of the switching command value range is set to be the resonance frequency, frequency modulation control can be performed by changing the switching frequency with the resonance frequency as the upper limit, in the range of the command value greater than the switching command value range. Here, when performing frequency modulation control, the fluctuation of the output voltage is reduced in the frequency range greater than the resonance frequency. Therefore, by performing frequency modulation control with the resonance frequency as the upper limit and performing overlap control at frequencies greater than the resonance frequency, it is possible to efficiently change the output voltage in a wider frequency range.

The power conversion device according to the first aspect, preferably, further includes an input converter unit that converts AC power input from an AC power supply outside the device into DC power, in which the inverter unit is configured to convert the DC power from the input converter unit and output AC power, the output converter unit is configured to output DC power for charging the battery mounted on the vehicle, and the control unit is configured to execute overlap control when the DC power is output from the output converter unit to the battery. Here, the types of batteries mounted in vehicles such as electric vehicles may be different for respective vehicle types. Therefore, in order to charge a different type of battery for each different vehicle type, it is necessary to supply DC power by changing the output voltage range so as to be compatible with each different type of battery. In contrast, in the present invention, when DC power is output to the battery, the output voltage range can be increased by switching between the frequency modulation control and the phase shift control while performing overlap control, so that it is possible to supply DC power within an output range compatible with a different battery for each vehicle type and suppress current ripples caused by control switching. Therefore, while effectively suppressing ripples in the output current, it is possible to output DC power compatible with each different type of battery for each vehicle type without changing the circuit configuration.

A control device for a power conversion device according to a second aspect of the present invention is a control device for a power conversion device including an inverter unit that includes a switching element and converts input direct current (DC) power to output alternating current (AC) power, a resonance circuit that includes a resonance capacitor connected in series to an output side of the inverter unit, a transformer that transforms the AC power that is input from the inverter unit via the resonance circuit and outputs the transformed AC power, and an output converter unit that converts the transformed AC power from the transformer into DC power and outputs the DC power, the control device controlling a switching operation of the switching element of the inverter unit, in which the control device is configured to switch between frequency modulation control for changing a switching frequency of the switching element and phase shift control for changing a phase difference in the switching operation of the switching element, based on an output from the output converter unit, and to execute, and when switching between the frequency modulation control and the phase shift control, execute overlap control for executing the phase shift control while executing the frequency modulation control, in a predetermined switching operation range.

In the control device for a power conversion device according to the second aspect of the present invention, as described above, when switching between frequency modulation control and phase shift control, overlap control is executed in which the phase shift control is performed while the frequency modulation control is performed, within a predetermined switching operation range. As a result, in an operation range in which an output change is small with respect to a command value change when phase shift control is executed, the frequency modulation control with a relatively large output change can be overlapped and executed. Therefore, in the vicinity of the command value at which the two controls are switched, it is possible to suppress the change in the output with respect to the change in the command value from becoming substantially zero, so that when the command value is changed so as to switch between the two controls, it is possible to suppress a large sudden change in the output from a substantially zero state. As a result, the change in the output with respect to the change in the command value can be smoothly changed, so that it is possible to provide a control device for a power conversion device capable of suppressing ripples in the output current, even when controlling the operations of the switching elements while switching between phase shift control and frequency modulation control.

A power conversion control method according to a third aspect of the present invention is a power conversion control method in a power conversion device including an inverter unit that includes a switching element and converts input direct current (DC) power to output alternating current (AC) power, a resonance circuit that includes a resonance capacitor connected in series to an output side of the inverter unit, a transformer that transforms the AC power that is input from the inverter unit via the resonance circuit and outputs the transformed AC power, an output converter unit that converts the transformed AC power from the transformer into DC power and outputs the DC power, and a control unit that controls a switching operation of the switching element of the inverter unit, the power conversion control method including: a step of measuring an output from the output converter unit; and a step of executing, based on the measured output from the output converter unit, any one of frequency modulation control for changing a switching frequency of the switching element, phase shift control for changing a phase difference in the switching operation of the switching element, and overlap control for executing the phase shift control while executing the frequency modulation control in a predetermined switching operation range.

In the power conversion control method according to the third aspect of the present invention, as described above, based on an output from the output converter unit, any one of frequency modulation control for changing the switching frequency of the switching element, phase shift control for changing a phase difference in the switching operation of the switching element, and overlap control for executing the phase shift control while executing the frequency modulation control in a predetermined switching operation range is executed. Thus, it is possible to switch between frequency modulation control for increasing the output voltage and phase shift control for decreasing the output voltage, and execute, and execute overlap control in a predetermined switching operation range, when switching between the frequency modulation control and the phase shift control. Therefore, when phase shift control is executed, frequency modulation control with relatively large output change can be overlapped and executed, in an operation range in which output change is small with respect to command value change, so that in the vicinity of the command value where the two controls are switched, it is possible to suppress the output change from becoming substantially zero with respect to the change of the command value. Thus, when the command value is changed so as to switch between the two controls, it is possible to suppress a large sudden change in the output from a substantially zero state. As a result, the change in the output with respect to the change in the command value can be smoothly changed, so that it is possible to provide a power conversion control method capable of suppressing ripples in the output current, even when controlling the operations of the switching elements while switching between phase shift control and frequency modulation control.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments embodying the present invention will be described with reference to the drawings.

First Embodiment

Next, the configuration of a power conversion device 100 according to a first embodiment will be described with reference to FIGS. 1 to 9.
(Configuration of Power Conversion Device)

Figure 1:
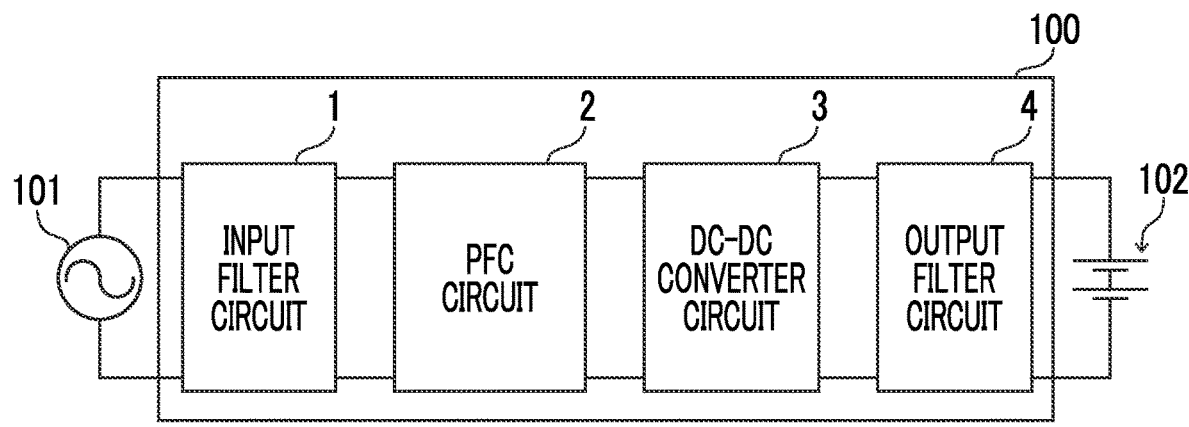
FIG. 1 is a block diagram showing the overall configuration of a power conversion device according to a first embodiment.

As shown in FIG. 1, the power conversion device 100 according to the first embodiment converts AC power input from an external AC power supply 101 (commercial power supply) and outputs DC power. The power conversion device 100 is mounted in a vehicle such as an Electric Vehicle (EV), for example. The power conversion device 100 charges a battery 102 mounted on a vehicle such as an EV. The power conversion device 100 also includes an input filter circuit 1, a PFC circuit 2 (power factor correction circuit), a DC-DC converter circuit 3, and an output filter circuit 4. In addition, the PFC circuit 2 is an example of the "input converter unit" in the scope of claims.

An input filter circuit 1 removes noise (harmonic components) of AC power input from the AC power supply 101. The input filter circuit 1 includes, for example, an AC reactor.

The PFC circuit 2 rectifies and smooths AC power input from an AC power supply 101 outside the device, and converts the AC power into DC power. The PFC circuit 2 includes, for example, a rectifier circuit with diodes connected in a full bridge. Further, the PFC circuit 2 has a switching element such as an Insulated Gate Bipolar Transistor (IGBT), a reactor, or the like, and improves the power factor of the input AC power. That is, the PFC circuit 2 reduces the phase difference between the input voltage and the input current. Further, the PFC circuit 2 suppresses harmonic components of the input current.

The DC-DC converter circuit 3 converts (transforms) the input DC power and outputs DC power. Details of the DC-DC converter circuit 3 will be described later.

The output filter circuit 4 suppresses noise (harmonic components) in the DC power output from the DC-DC converter circuit 3. The output filter circuit 4 includes, for example, an LC filter circuit with a reactor (inductor) and a capacitor.
(Configuration of DC-DC Converter Circuit)

Figure 2:
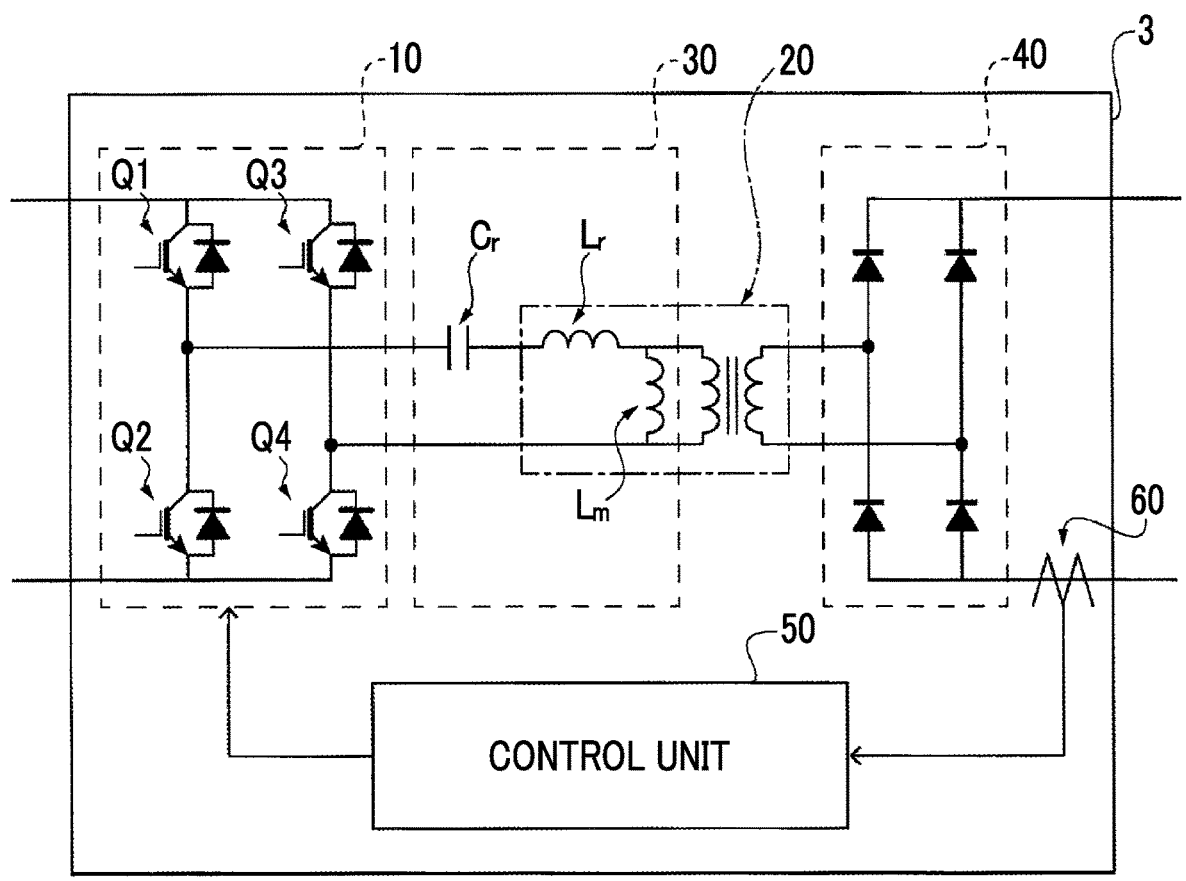
FIG. 2 is a block diagram showing the configuration of a DC-DC converter circuit according to the first embodiment.

As shown in FIG. 2, the DC-DC converter circuit 3 according to the first embodiment includes a current resonant DC-DC converter circuit including a series resonant circuit. The DC-DC converter circuit 3 includes an inverter unit 10, a transformer 20, a resonance circuit 30, an output converter unit 40, a control unit 50, and a current detector 60. Note that the control unit 50 is an example of a "control unit" and a "control device" in the claims.

The inverter unit 10 includes switching elements Q1, Q2, Q3, and Q4. The switching elements Q1 to Q4 include, for example, IGBTs. The switching elements Q1 to Q4 perform switching operations under the control of the control unit 50. Further, the switching elements Q1 to Q4 form a full bridge circuit. The inverter unit 10 converts the DC power input from the PFC circuit 2 and outputs AC power.

The transformer 20 transforms and outputs the AC power from the inverter unit 10 that is input via the resonance circuit 30. The transformer 20 includes a primary winding and a secondary winding. The primary winding of the transformer 20 has a leakage inductance $L_r$ and an exciting inductance $L_m$. The leakage inductance $L_r$ is a component that acts as an inductor connected in series with transformer 20 in which a portion of the primary winding does not contribute to the transforming action. Further, the exciting inductance $L_m$ is the inductance of the portion of the primary winding that contributes to the transforming action. That is, the transformer 20 in FIG. 2 shows an equivalent circuit of the actual transformer 20 (transformer).

The resonance circuit 30 includes a resonance capacitor $C_r$. The resonance capacitor $C_r$ is connected in series to the output side of the inverter unit 10. The resonance circuit 30 is configured by the leakage inductance $L_r$ and the exciting inductance $L_m$ of the transformer 20, and the resonance capacitor $C_r$. In addition to the leakage inductance $L_r$ of the transformer 20, the resonance circuit 30 may be configured by actually connecting an inductor (such as a choke coil) in series with the resonance capacitor $C_r$.

The output converter unit 40 converts the transformed AC power from the transformer 20 into DC power and outputs the DC power. Specifically, the output converter unit 40 is configured to output DC power for charging the battery 102 mounted on the vehicle. Further, the output converter unit 40 includes a rectifier circuit configured by full-bridge-connected diodes.

The control unit 50 (control device) includes, for example, a microcontroller having a Central Processing Unit (CPU) and a flash memory. The control unit 50 controls the switching operations of the switching elements Q1 to Q4 of the inverter unit 10. Specifically, the control unit 50 outputs gate signals $G_f$ and $G_s$ (see FIGS. 6 and 7) for switching ON and OFF of switching of the switching elements Q1 to Q4. Further, the control unit 50 acquires a detection signal detected by the current detector 60.

The current detector 60 measures the output from the output converter unit 40. Specifically, the current detector 60 detects the current of the DC power output by the output converter unit 40. The current detector 60 then transmits a detection signal based on the measured (detected) output current to the control unit 50. The current detector 60 includes, for example, a current transformer (CT).

(Switching of Control by Control Unit)

Figure 3:
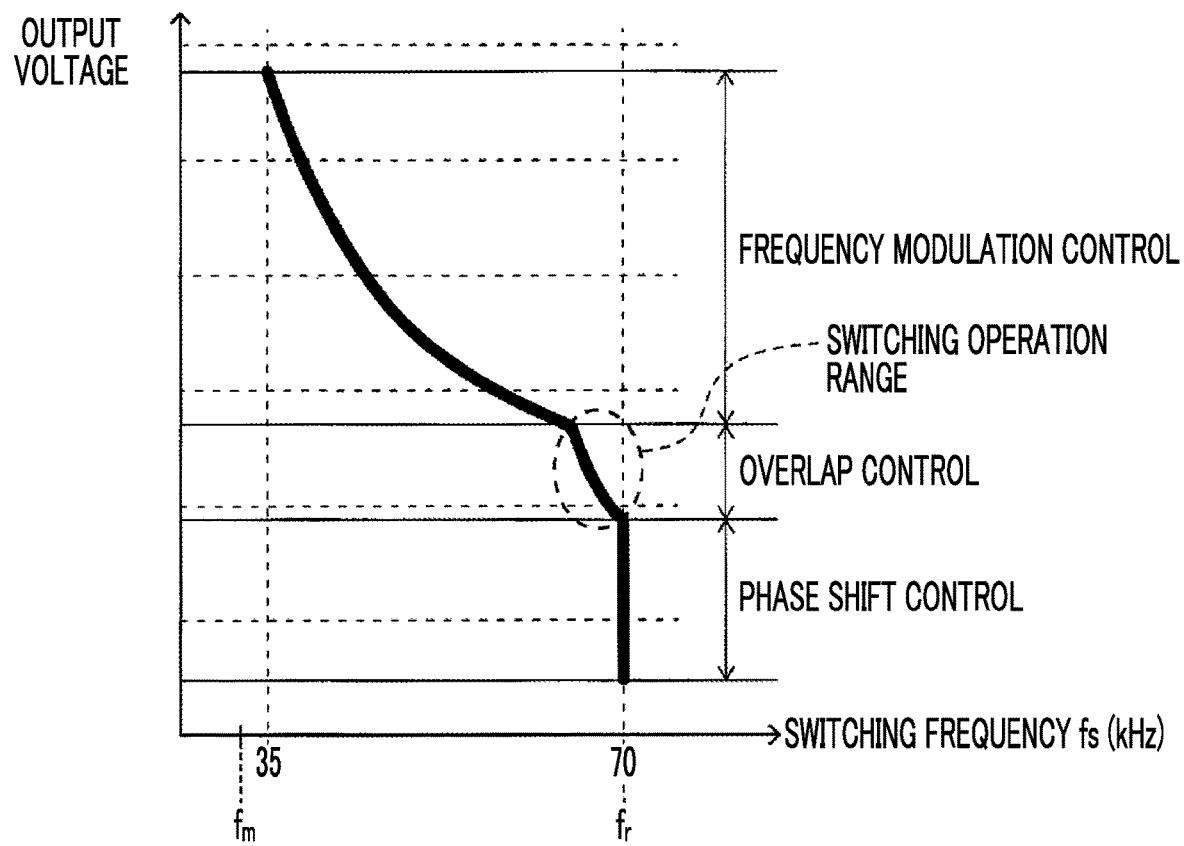
FIG. 3 is a diagram showing a change in an output voltage due to frequency modulation control, phase shift control, and overlap control according to the first embodiment.

As shown in FIG. 3, in the first embodiment, the control unit 50 (control device) is configured to switch between frequency modulation control and phase shift control and execute, based on the output from the output converter unit 40. Specifically, the control unit 50 increases the output voltage, by decreasing the switching frequency $f_s$ through frequency modulation control. Then, the control unit 50 reduces the phase difference $DT_s$ between the switching operations of the switching elements Q1 and Q2 and the switching elements Q3 and Q4 from half the period $T_s$ (see FIG. 7) through phase shift control, thereby reducing the output voltage. The control unit 50 is configured to output power with a wide range of output voltages by switching between frequency modulation control and phase shift control. Further, the control unit 50 is configured to, when switching between frequency modulation control and phase shift control, execute overlap control in which the phase shift control is performed while the frequency modulation control is performed, within a predetermined switching operation range.

Figure 4:
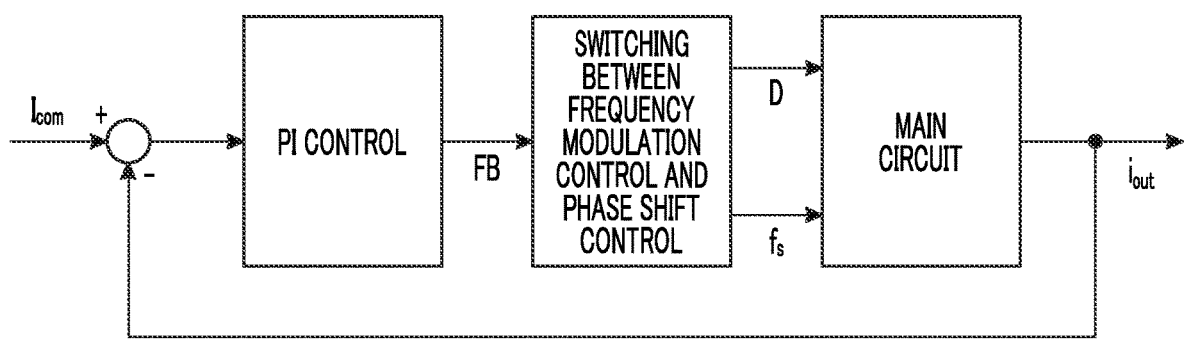
FIG. 4 is a diagram for explaining acquisition of a command value according to the first embodiment.

As shown in FIG. 4, the control unit 50 is configured to acquire a command value FB for setting the switching frequency $f_s$ and the phase difference $DT_s$ (phase shift amount D), based on the output from the output converter unit 40. The phase shift amount D is a numerical value for setting the phase difference $DT_s$ in the switching operation, and is set as a ratio to the period $T_s$ (reciprocal of the switching frequency $f_s$) of the switching operation. The phase shift amount D is a numerical value of 1.0 or less. As an example, when the phase shift amount D is 0.5, the phase difference $DT_s$ is 0.5 times the switching operation period $T_s$ (half-wavelength period). The command value FB is a value (control amount) that is adjusted such that the voltage and current (output current value $i_{out}$) of the DC power output from the output converter unit 40 are adjusted to a preset predetermined output. Further, the command value FB is acquired within a value range of 0.1 or more and 1.0 or less.

Specifically, the control unit 50 acquires the command value FB by executing PI control based on the preset current command value $I_{com}$ and the output current value $i_{out}$ detected by the current detector 60. That is, the control unit 50 acquires a command value FB so as to output a current with the magnitude of the preset current command value $I_{com}$, by feedback control using the preset current command value $I_{com}$ and the output current value $i_{out}$ of the current output from the output converter unit 40.

Then, the control unit 50 sets the switching frequency $f_s$ and the phase difference $DT_s$ (phase shift amount D) of the switching elements Q1 to Q4, based on the acquired command value FB. The control unit 50 controls the switching operations of the switching elements Q1 to Q4 in the main circuit (inverter unit 10), based on the set switching frequency $f_s$ and the phase shift amount D. That is, based on the output from the output converter unit 40, the control unit 50 is configured to switch between frequency modulation control for changing the switching frequency $f_s$ of the switching elements Q1 to Q4, and phase shift control for changing the phase difference $DT_s$ in the switching operations of the switching elements Q1 to Q4, and execute.

Figure 5:
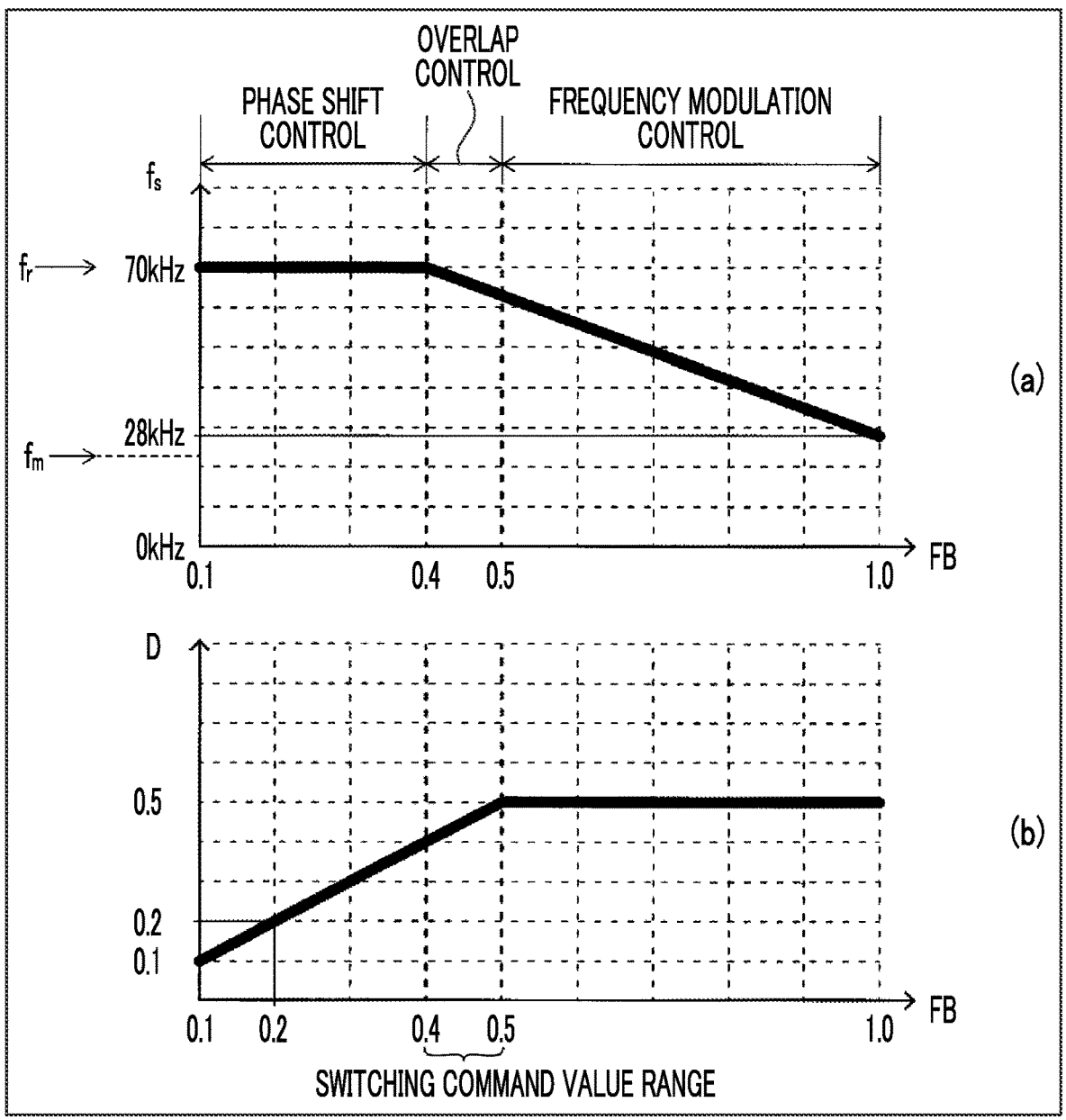
FIG. 5 is a diagram showing the relationship between the command value, the switching frequency, and the phase shift amount according to the first embodiment, where (a) is a diagram for explaining the change in the switching frequency, and (b) is a diagram for explaining the change in the phase shift amount.

Specifically, as shown in FIG. 5, when the command value FB is greater than 0.5 and equal to or less than 1.0, the control unit 50 sets the phase difference $DT_s$ constant and executes only the frequency modulation control. Then, when the command value FB is 0.1 or more and less than 0.4, the control unit 50 sets the switching frequency $f_s$ to a constant fixed frequency (resonance frequency $f_r$) and executes only the phase shift control. The resonance frequency $f_r$ referred to here indicates a fixed resonance frequency by the leakage inductance $L_r$ and the resonance capacitor $C_r$.

Further, when the command value FB is a value within a preset switching command value range (0.4 or more and 0.5 or less), the control unit 50 executes overlap control in a predetermined switching operation range. That is, when the command value FB is 0.4 or more and 0.5 or less, the control unit 50 is configured to execute overlap control, by changing the phase difference $DT_s$ (the phase shift amount D) while changing the switching frequency $f_s$. In other words, the control unit 50 changes the switching frequency $f_s$ when the command value FB is 0.4 or more, and changes the phase difference $DT_s$ (phase shift amount D) when the command value FB is 0.5 or less.

As shown in (a) of FIG. 5, the resonance frequency $f_r$ of the resonance circuit 30 is, for example, 70 kHz. In the first embodiment, the control unit 50 sets the switching frequency $f_s$ when the acquired command value FB is the minimum value (0.4) in the switching command value range (0.4 or more and 0.5 or less) to be the resonance frequency $f_r$ (70 kHz) of the resonance circuit 30. Therefore, when the command value FB is 0.4 or less, the control unit 50 sets the switching frequency $f_s$ constant to 70 kHz, which is the magnitude of the resonance frequency $f_r$. Then, when the command value FB is greater than 0.4, the control unit 50 linearly decreases the value of the switching frequency $f_s$ in proportion to the increase in the command value FB. That is, in the first embodiment, when the command value FB is the switching command value range (0.4 or more and 0.5 or less) and the overlap control is executed, the control unit 50 sets the switching frequency $f_s$ to a frequency equal to or lower than the resonance frequency $f_r$. The control unit 50 linearly decreases the switching frequency $f_s$, even when the command value FB is greater than 0.5 and only frequency modulation control is executed. The switching frequency $f_s$ gradually decreases as the command value FB increases. For example, when the command value FB is 1.0, the switching frequency $f_s$ is set to 28 kHz.

The magnitude of the switching frequency $f_s$ (minimum value of the switching frequency $f_s$) when the command value FB is 1.0 (maximum value) is set to be a value greater than the resonance frequency $f_m$, which is separate from the resonance frequency $f_r$. The resonance frequency $f_s$ fluctuates depending on the magnitude of the load (battery 102) connected to the outside of the device, and is the resonance frequency of the leakage inductance $L_r$, the exciting inductance La, and the resonance capacitor $C_r$. In general, since the output voltage decreases when the switching frequency $f_s$ is set lower than the resonance frequency $f_m$, frequency modulation control is executed in a frequency range in which the switching frequency $f_s$ is greater than the resonance frequency $f_s$.

Further, as shown in (b) of FIG. 5, in the first embodiment, when the command value FB is within the range of 0.4 or more and 0.5 or less (switching command value range) and the overlap control is executed, the control unit 50 changes the phase difference $DT_s$ to be less than half the switching period $T_s$. Specifically, the control unit 50 sets the phase shift amount D to a value equal to the command value FB within the range of the command value FB of 0.1 or more and 0.5 or less. For example, when the command value FB is 0.2, the phase shift amount D is similarly set to 0.2. That is, when the command value FB is 0.5 or less, the phase difference $DT_s$ decreases as the command value FB decreases.

Then, when the command value FB is greater than 0.5, the control unit 50 sets the phase shift amount D to a constant value of 0.5. That is, when the command value FB is greater than 0.5, the control unit 50 sets the phase difference $DT_s$ constant to 0.5 times the period $T_s$ of the switching operation (half-wavelength period), and executes frequency modulation control.

<Regarding Output of Gate Signal by Control Unit>

Figure 6:
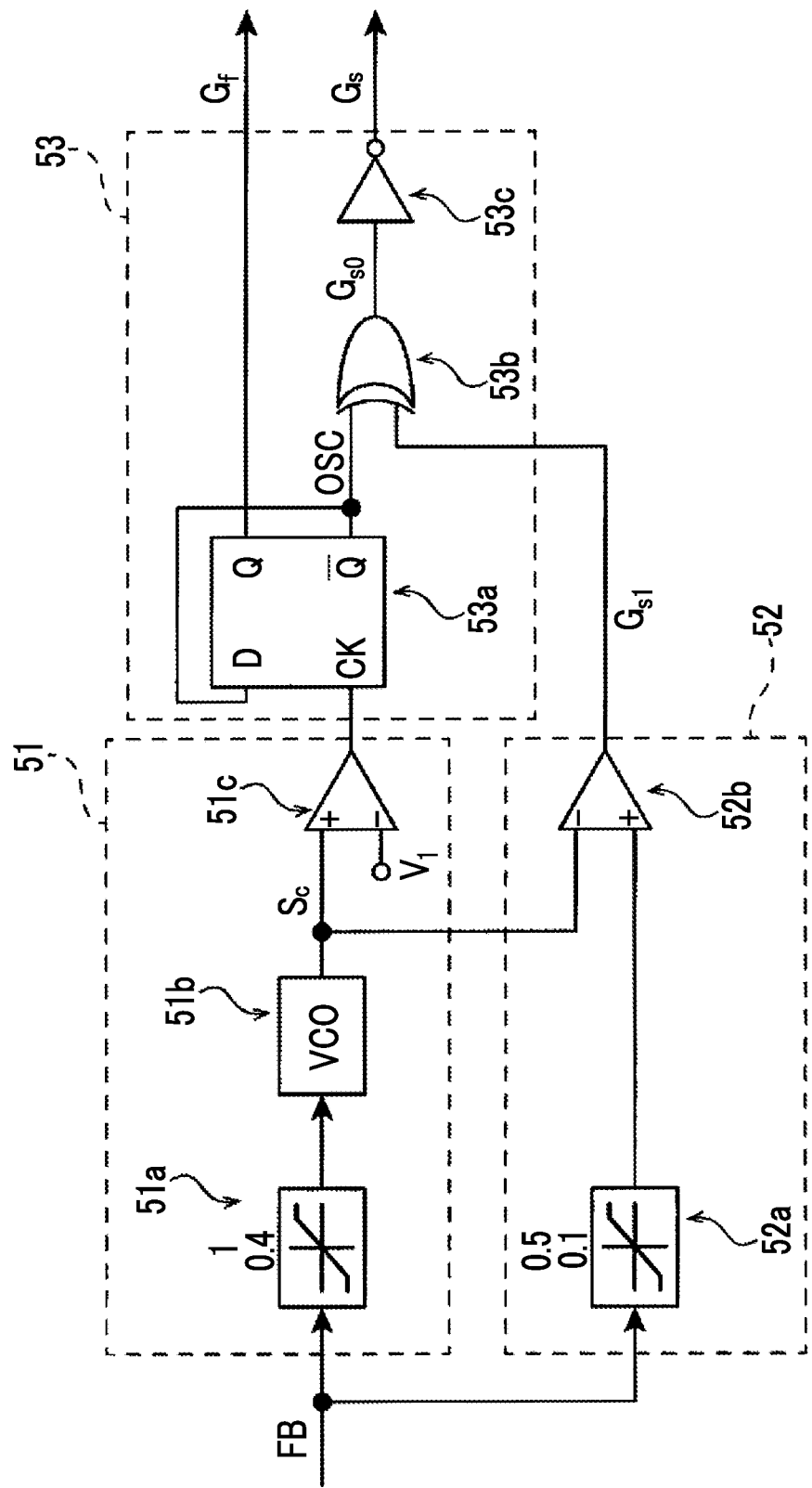
FIG. 6 is a circuit diagram showing an example of a frequency modulation control circuit, a phase shift control circuit, and a gate signal generation circuit in the control unit according to the first embodiment.
Figure 7:
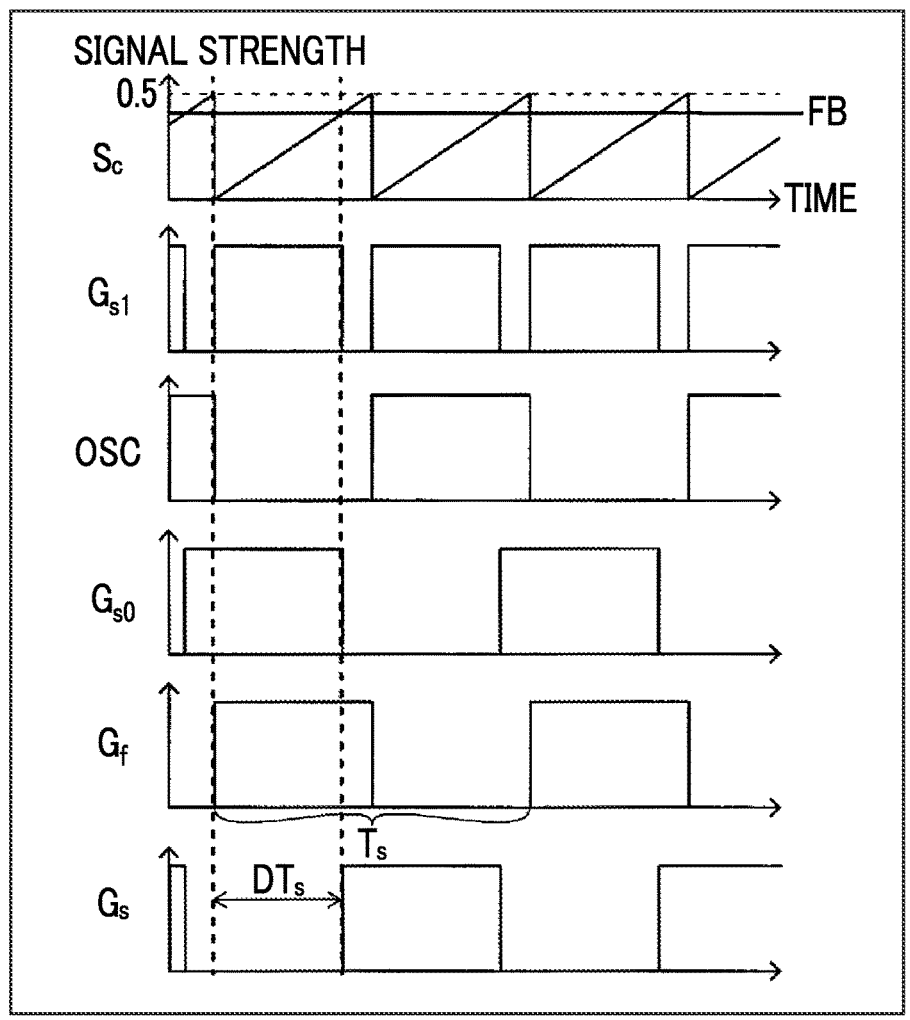
FIG. 7 is a diagram showing an example of signals in the circuit of FIG. 6.

As shown in FIGS. 6 and 7, the control unit 50 sets the switching frequency $f_s$ and the phase difference $DT_s$ (the phase shift amount D) based on the acquired command value FB, thereby acquiring a gate signal $G_f$ and a gate signal $G_s$ for controlling the switching operations of the switching elements Q1 to Q4. For example, the control unit 50 includes a frequency modulation control circuit 51, a phase shift control circuit 52, and a gate signal generation circuit 53.

As shown in FIG. 6, the frequency modulation control circuit 51 includes a limiter 51*a*, an oscillator 51*b*, and a comparator 51*c*. The limiter 51*a* outputs a value equal to the command value FB when the command value FB is 0.4 or more and 1.0 or less, and outputs a constant value of 0.4 when the command value FB is smaller than 0.4. The oscillator 51*b* includes a Voltage-controlled oscillator (VCO). The oscillator 51*b* operates as an integrator and outputs a sawtooth wave carrier signal $S_c$ (see FIG. 7) having a frequency based on the limiter 51*a*. The comparator 51*c* then compares the magnitudes between the carrier signal $S_c$ with the reference value $V_1$. The reference value $V_1$ is 0.25.

The phase shift control circuit 52 includes a limiter 52*a* and a comparator 52*b*. The limiter 52*a* outputs a value equal to the command value FB when the command value FB is 0.1 or more and 0.5 or less, and outputs a constant value of 0.5 when the command value FB is greater than 0.5. The comparator 52*b* compares the magnitudes between the output value from the limiter 52*a* and the carrier signal $S_c$ output from the oscillator 51*b*. The comparator 52*b* then outputs an output signal $G_{s1}$.

The gate signal generation circuit 53 includes a flip-flop circuit 53*a*, an XOR circuit 53*b*, and a NOT circuit 53*c*. The flip-flop circuit 53*a* configures a counter circuit that receives the output from the comparator 51*c* as a clock input. The flip-flop circuit 53*a* outputs a gate signal $G_f$ and an output signal OSC, based on the output from the comparator 51*c*. The XOR circuit 53*b* performs an exclusive OR operation on the output signal OSC and the output signal $G_{s1}$, and outputs an output signal $G_{s0}$. The NOT circuit 53*c* outputs the gate signal $G_s$ by negating the output signal $G_{s0}$.

As shown in FIG. 7, for example, when the command value FB is 0.45, which is a value within the switching command value range (0.4 or more and 0.5 or less), and overlap control is being performed, the oscillator 51*b* outputs a sawtooth wave (carrier signal $S_c$) having a frequency of (98 k−70 k×FB)×2 (133 kHz). Then, based on the output from the comparator 51*c*, the flip-flop circuit 53*a* outputs the gate signal $G_f$ whose frequency is half (66.5 kHz) of the carrier signal $S_c$. Further, based on the output signal OSC from the flip-flop circuit 53*a* and the output signal $G_{s1}$ from the comparator 52*b*, the gate signal $G_s$ is output via the XOR circuit 53*b* and the NOT circuit 53*c*. The gate signal $G_s$ has a phase shift amount D of FB (0.45) with respect to the gate signal $G_f$. Therefore, the switching frequency $f_s$ of the switching elements Q1 to Q4 is 66.5 kHz, which is lower than the fixed frequency (resonance frequency $f_r$: 70 kHz) by 3.5 kHz, and the gate signal $G_s$ is out of phase with the gate signal $G_f$ by 45% (approximately 6.7 μs) of the period $T_s$.

Figure 8:
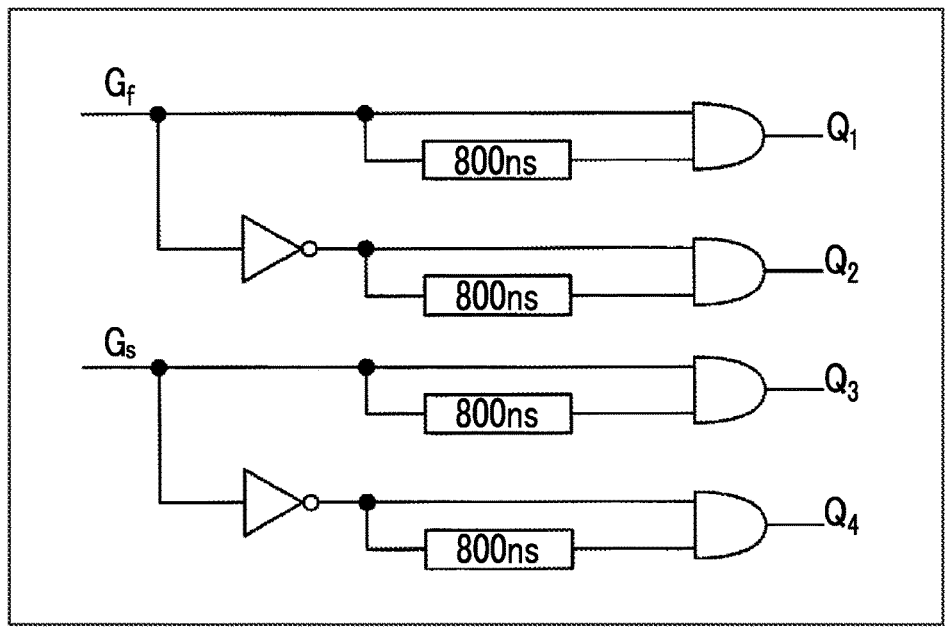
FIG. 8 is a circuit diagram showing an example of a circuit that generates signals for controlling switching elements based on a gate signal.

As shown in FIG. 8, the control unit 50 controls the switching operations of the switching elements Q1 to Q4, based on the acquired gate signals $G_f$ and $G_s$. Specifically, the operations of the switching elements Q1 and Q2 are controlled based on the gate signal $G_f$. For example, a dead time of 800 ns (nanoseconds) is added to the gate signal $G_f$ to control the switching element Q1. Further, a dead time is similarly added to the gate signal $G_f$ through the NOT circuit to control the switching element Q2. The dead time means a delay time added to the rising portions of the gate signals $G_f$ and $G_s$ to prevent short-circuiting of the upper and lower arms of switching elements Q1 to Q4. Therefore, based on the acquired gate signal $G_f$, the control unit 50 causes the switching elements Q1 and Q2 to perform the switching operation to alternately turn on with a dead time of 800 ns. Similarly, switching elements Q3 and Q4 are controlled based on the gate signal $G_s$.

Thus, the control unit 50 acquires the gate signals $G_f$ and $G_s$ for controlling the switching operations of the switching elements Q1 to Q4, based on the acquired command value FB. When DC power is output from the output converter unit 40 to the battery 102, based on the acquired gate signals $G_f$ and $G_s$, the control unit 50 is configured to, with respect to the control process for the switching elements Q1 to Q4, switch between frequency modulation control and phase shift control and to execute, and execute overlap control in a predetermined switching operation range.

Figure 9:
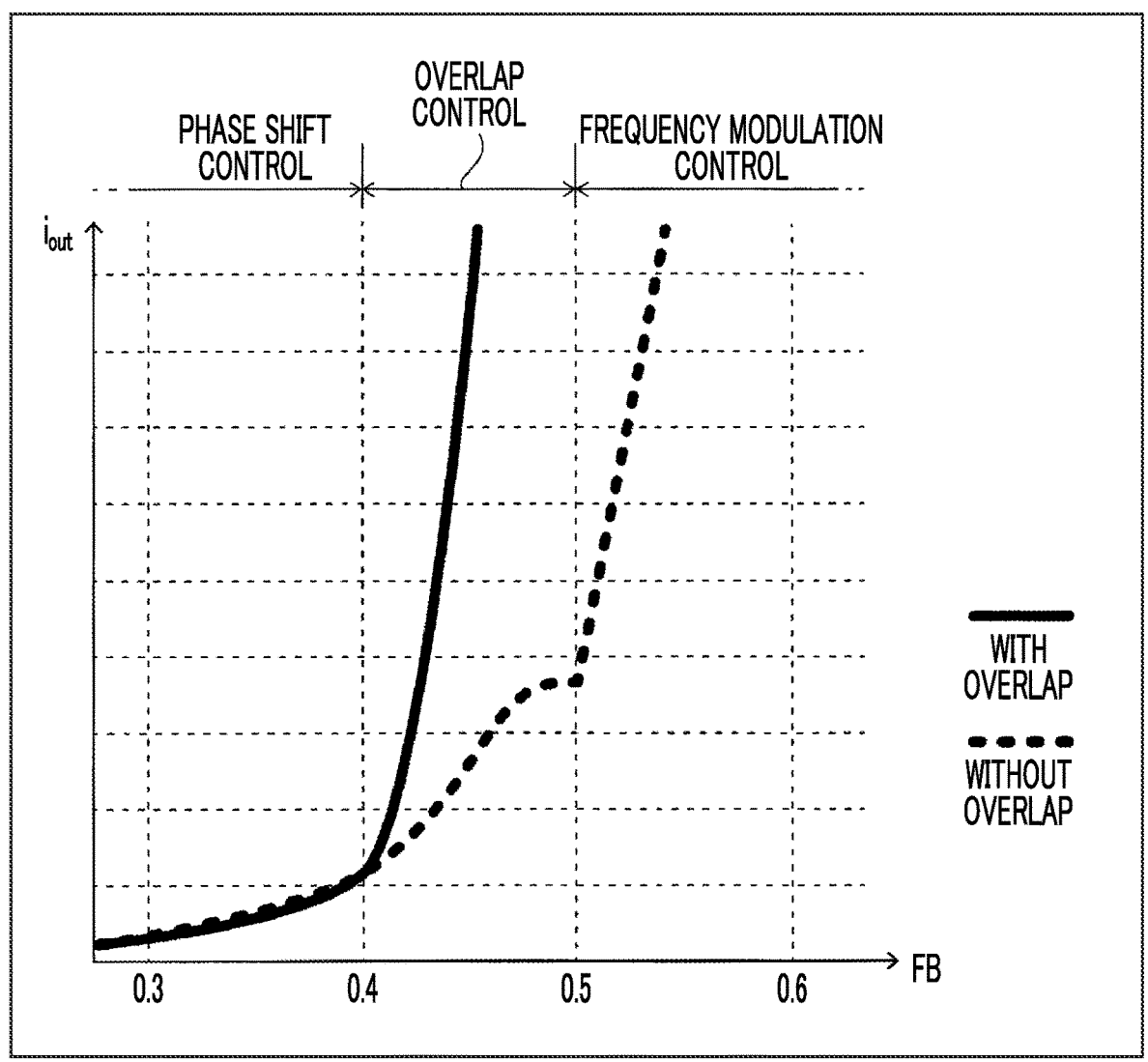
FIG. 9 is a diagram showing the relationship between the command value and the output current according to the first embodiment.

As shown by the solid line in FIG. 9, when switching between the phase shift control and the frequency modulation control, by performing overlap control in a predetermined switching operation region (switching command value region), the change in the output current value $i_{out}$ with respect to the change in the command value FB become smooth. In addition, as shown by the dotted line in FIG. 9, when the phase shift control and the frequency modulation control are switched without performing the overlap control, a change in the output current value $i_{out}$ with respect to the change in the command value FB in the phase shift control and the frequency modulation control is different from the output current value in the overlap control.

(Control Process According to First Embodiment)

Figure 10:
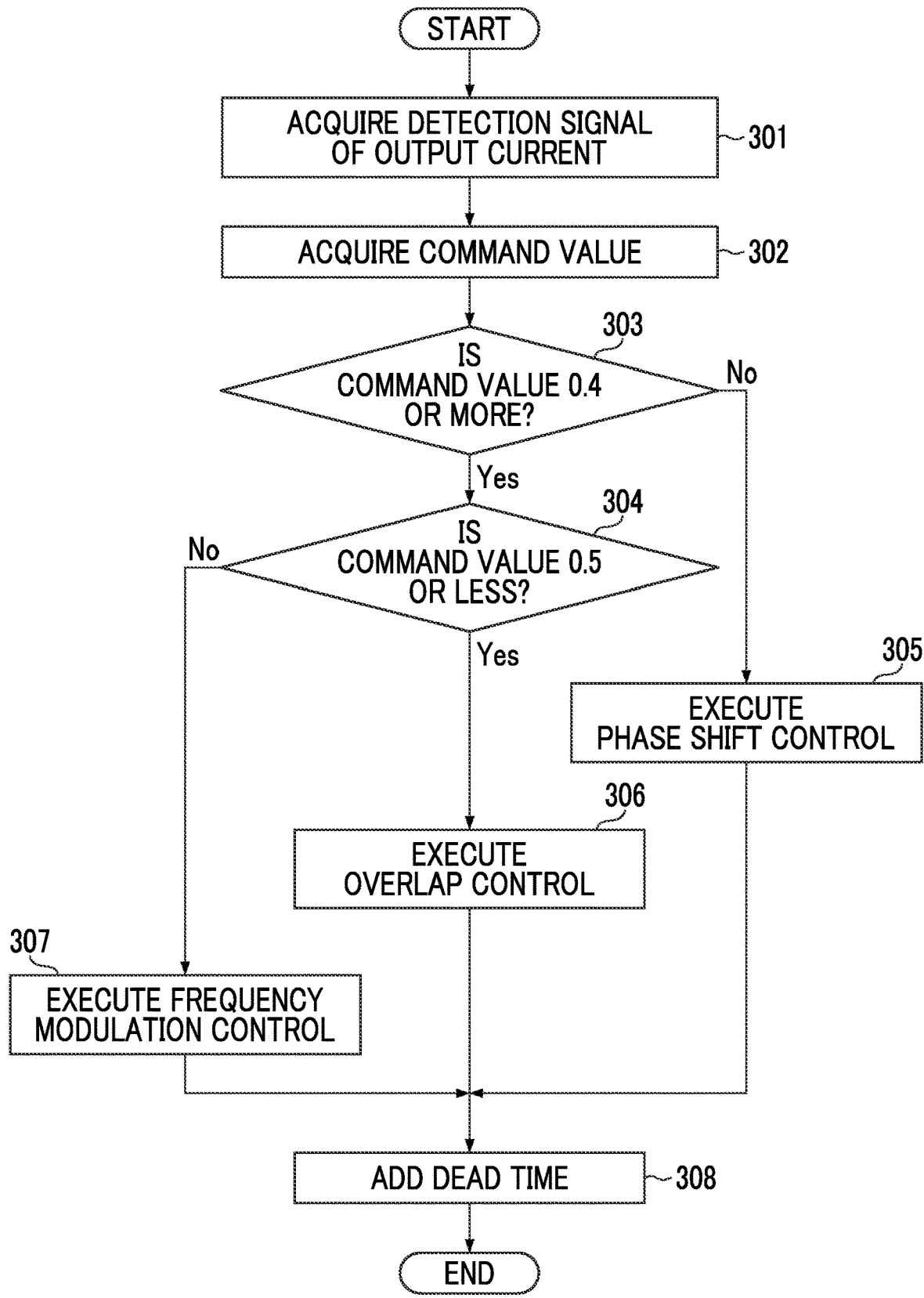
FIG. 10 is a flowchart for explaining a power conversion control method according to the first embodiment.

Next, with reference to FIG. 10, a control processing flow regarding the power conversion control method by the power conversion device 100 of the first embodiment will be described. Further, the control regarding this power conversion control method is performed by the control unit 50 (control device).

First, in step 301, the output from the output converter unit 40 is measured. Specifically, a detection signal based on the output current value $i_{out}$ measured (detected) by the current detector 60 is acquired.

Next, in step 302, a command value FB is acquired based on the acquired detection signal (output current value $i_{out}$) and a preset current command value $I_{com}$.

Next, in step 303, it is determined whether or not the acquired command value FB is 0.4 or more. When it is determined that the command value FB is 0.4 or more, the process proceeds to step 304. Then, when it is determined that the command value FB is not 0.4 or more, the process proceeds to step 305.

In step 304, it is determined whether or not the acquired command value FB is 0.5 or less. When it is determined that the command value FB is 0.5 or less, the process proceeds to step 306. Then, when it is determined that the command value FB is not 0.5 or less, the process proceeds to step 307.

In step 305, phase shift control for changing the phase difference $DT_s$ in the switching operations of the switching elements Q1 to Q4 is performed. Specifically, the switching frequency $f_s$ is set to a constant fixed frequency (resonance frequency $f_r$), and only phase shift control is performed. Then, the process proceeds to step 308.

In step 306, overlap control is performed in which phase shift control is executed while frequency modulation control is executed within a predetermined switching operation range. Specifically, overlap control is performed by changing the phase difference $DT_s$ (phase shift amount D) while changing the switching frequency $f_s$ of the switching elements Q1 to Q4, in a predetermined switching operation range (switching command value range). Then, the process proceeds to step 308.

In step 307, frequency modulation control for changing the switching frequency $f_s$ of the switching elements Q1 to Q4 is performed. Specifically, the phase difference $DT_s$ (phase shift amount D) is set constant, and only frequency modulation control is executed. Then, the process proceeds to step 308.

In step 308, dead time is added to gate signals $G_f$ and $G_s$ generated by any of phase shift control, frequency modulation control, and overlap control. That is, the rising portions of the pulses of the generated gate signals $G_f$ and $G_s$ are cut off by the dead time (800 ns, for example). The switching operations (switching on and off) of the switching elements Q1 to Q4 are controlled based on the generated gate signals $G_f$ and $G_q$.

It should be noted that the determination as to the range of the command value FB in steps 303 and 304 may be performed prior to either control. That is, the determination as to whether the command value FB is 0.4 or more may be performed, after the determination as to whether the command value FB is 0.5 or less. Even in that case, when the command value FB is smaller than 0.4, the phase shift control in step 305 is executed, when the command value FB is 0.4 or more and 0.5 or less, the overlap control in step 306 is executed, and when the command value FB is greater than 0.5, the frequency modulation control in step 307 is executed. Further, the control process in steps 301 to 308 is executed every period $T_s$ of the switching operation.

Effect of First Embodiment

In the first embodiment, the following effects can be obtained.

In the first embodiment, as described above, when switching between frequency modulation control and phase shift control, overlap control is executed in which the phase shift control is performed while the frequency modulation control is performed, within a predetermined switching operation range. As a result, in an operation range in which an output change is smaller with respect to the change in the command value FB when phase shift control is executed, frequency modulation control with a relatively large output change can be overlapped and executed. Therefore, in the vicinity of the command value FB at which the two controls are switched, it is possible to suppress the change in the output with respect to the change in the command value FB from becoming substantially zero, so that when the command value FB is changed so as to switch between the two controls, it is possible to suppress a large sudden change in the output from a substantially zero state. As a result, the change in the output with respect to the change in the command value FB can be smoothly changed, so that even when controlling the operations of the switching elements Q1 to Q4 while switching between phase shift control and frequency modulation control, ripples in the output current can be suppressed.

Further, in the first embodiment, as described above, the control unit 50 is configured to switch between executing only the frequency modulation control by setting the phase difference $DT_s$ constant and executing only the phase shift control by setting the switching frequency $f_s$ to a constant fixed frequency, and execute the overlap control, by changing the phase difference $DT_s$ while changing the switching frequency $f_s$ in the predetermined switching operation range. Thus, outside the predetermined switching operation range, only one of frequency modulation control and phase shift control can be executed without switching therebetween, so that it is possible to suppress the inclusion of ripples in the output current due to the switching of control. Since it is possible to switch between the frequency modulation control and the phase shift control while executing overlap control in a predetermined switching operation range, even in an operation range in which the frequency modulation control and the phase shift control are switched, it is possible to suppress the inclusion of ripples in the output current. Therefore, the ripples included in the output current can be suppressed, even when any one of frequency modulation control, phase shift control, and overlap control is executed.

Further, in the first embodiment, as described above, the control unit 50 is configured to execute the frequency modulation control by setting the phase difference $DT_s$ constant to half a period $T_s$ of a switching operation, and execute the overlap control by changing the switching frequency $f_s$ while changing the phase difference $DT_s$ to be less than half the period $T_s$ of the switching operation. Here, when the phase difference $DT_s$ in the switching operation is half the period $T_s$ of the switching operation, the switching operation is performed with a phase difference $DT_s$ of 180° (opposite phase), so that as compared to the case where the phase difference $DT_s$ is shifted from 180°, the inverter unit 10 can efficiently perform the power conversion operation. Therefore, when frequency modulation control is executed to increase the output voltage, the output voltage can be efficiently increased by setting the phase difference $DT_s$ constant to half the period $T_s$ of the switching operation. When the output voltage is reduced by switching from frequency modulation control to phase shift control, overlap control for changing the switching frequency $f_s$ while changing (decreasing) the phase difference $DT_s$ to less than half the period $T_s$ of the switching operation is executed. Therefore, it is possible to reduce the output voltage while effectively suppressing the ripples included in the output current in a predetermined switching operation range. As a result, by switching between frequency modulation control and phase shift control while executing overlap control, it is possible to efficiently change the output voltage while suppressing current ripples caused by the switching of control.

Further, in the first embodiment, as described above, the control unit 50 is configured to acquire a command value FB for setting the switching frequency $f_s$ and the phase difference $DT_s$, based on an output from the output converter unit 40, and execute the overlap control, in a predetermined switching operation range, when the command value FB is a value within a preset switching command value range (0.4 or more and 0.5 or less). Thus, the command value FB is acquired based on the output from the output converter unit 40, so that control in which the output is reflected (feedbacked) can be easily executed, by controlling the switching frequency $f_s$ and the phase difference $DT_s$, based on the acquired command value FB. In addition, when the command value FB for setting the switching frequency $f_s$ and the phase difference $DT_s$ is within the switching command value range, it is configured to execute overlap control, so that changing the switching frequency $f_s$, changing the phase difference $DT_s$, and executing the overlap control can be executed by a common command value FB. Therefore, the processing load can be reduced as compared to the case where changing the switching frequency $f_s$, changing the phase difference $DT_s$, and executing the overlap control are executed by separate control processes.

Further, in the first embodiment, as described above, the control unit 50 is configured to set the switching frequency $f_s$ when the acquired command value FB is the minimum value (0.4) of the switching command value range (0.4 or more and 0.5 or less) to be the resonance frequency $f_r$ of the resonance circuit 30, and when the acquired command value FB is a value within the switching command value range, the control unit 50 is configured to set the switching frequency $f_s$ to a frequency equal to or lower than the resonance frequency $f_r$, and execute overlap control. Thus, since the maximum value of the switching frequency $f_s$ in the overlap control is the switching frequency $f_s$ in the phase shift control, by setting the switching frequency $f_s$ to a frequency equal to or lower than the resonance frequency $f_r$, and performing the overlap control, the switching frequency $f_s$ when performing the phase shift control can be set to the resonance frequency $f_r$. Therefore, since the phase shift control can be executed without increasing the switching frequency $f_s$ more than necessary, it is possible to suppress an unnecessary increase in the number of switching operations. As a result, when performing phase shift control, it is possible to suppress a decrease in power conversion efficiency due to a large number of switching operations.

Further, in the first embodiment, as described above, the PFC circuit 2 (input converter unit) that converts the AC power input from the AC power supply 101 outside the device to DC power is further provided, the inverter unit 10 is configured to convert the DC power from the PFC circuit 2 and output AC power, the output converter unit 40 is configured to output DC power for charging the battery 102 mounted on the vehicle, and the control unit 50 is configured to execute overlap control when the DC power is output from the output converter unit 40 to the battery 102. Here, the types of batteries 102 mounted in vehicles such as electric vehicles may be different for respective vehicle types. Therefore, in order to charge a different type of battery 102 for each different vehicle type, it is necessary to supply DC power by changing the output voltage range so as to be compatible with each different type of battery 102. In contrast, in the first embodiment, when DC power is output to the battery 102, the range of output voltage can be increased by switching between frequency modulation control and phase shift control while executing overlap control, so that it is possible to supply DC power within an output range compatible with a different battery 102 for each vehicle type, and to suppress current ripples caused by control switching. Therefore, while effectively suppressing ripples in the output current, it is possible to output DC power compatible with each different type of battery 102 for each vehicle type without changing the circuit configuration.

(Effect of Power Conversion Control Method by Power Conversion Device of First Embodiment)

The following effects can be obtained in the power conversion control method by the power conversion device 100 of the first embodiment.

In the power conversion control method by the power conversion device 100 of the first embodiment, as described above, based on a measured output from the output converter unit 40, any one of frequency modulation control for changing the switching frequency $f_s$ of the switching elements Q1 to Q4, phase shift control for changing a phase difference $DT_s$ in the switching operation of the switching elements Q1 to Q4, and overlap control for executing the phase shift control while executing the frequency modulation control in a predetermined switching operation range is executed. Thus, it is possible to switch between frequency modulation control for increasing the output voltage and phase shift control for decreasing the output voltage and to execute, and execute overlap control in a predetermined switching operation range, when switching between the frequency modulation control and the phase shift control. Therefore, when phase shift control is executed, frequency modulation control with relatively large output change can be overlapped and executed, in an operation range in which output change is small with respect to command value FB change, so that in the vicinity of the command value FB where the two controls are switched, it is possible to suppress the output change from becoming substantially zero with respect to the change of the command value FB. Thus, when the command value FB is changed so as to switch between the two controls, it is possible to suppress a large sudden change in the output from a substantially zero state. As a result, the change in the output with respect to the change in the command value FB can be smoothly changed, so that it is possible to provide a power conversion control method capable of suppressing ripples in the output current, even when controlling the operations of the switching elements Q1 to Q4 while switching between phase shift control and frequency modulation control.

Second Embodiment

Next, the configuration of a power conversion device 200 according to a second embodiment will be described with reference to FIGS. 11 and 12. Unlike the first embodiment in which the fixed frequency is set to be the resonance frequency $f_r$ (70 kHz), in the second embodiment, the fixed frequency is set to be a frequency greater than the resonance frequency $f_r$. The same components as the components in the first embodiment are designated by the same reference numerals, and the description thereof will be omitted.

(Configuration of Power Conversion Device According to Second Embodiment)

Figure 11:
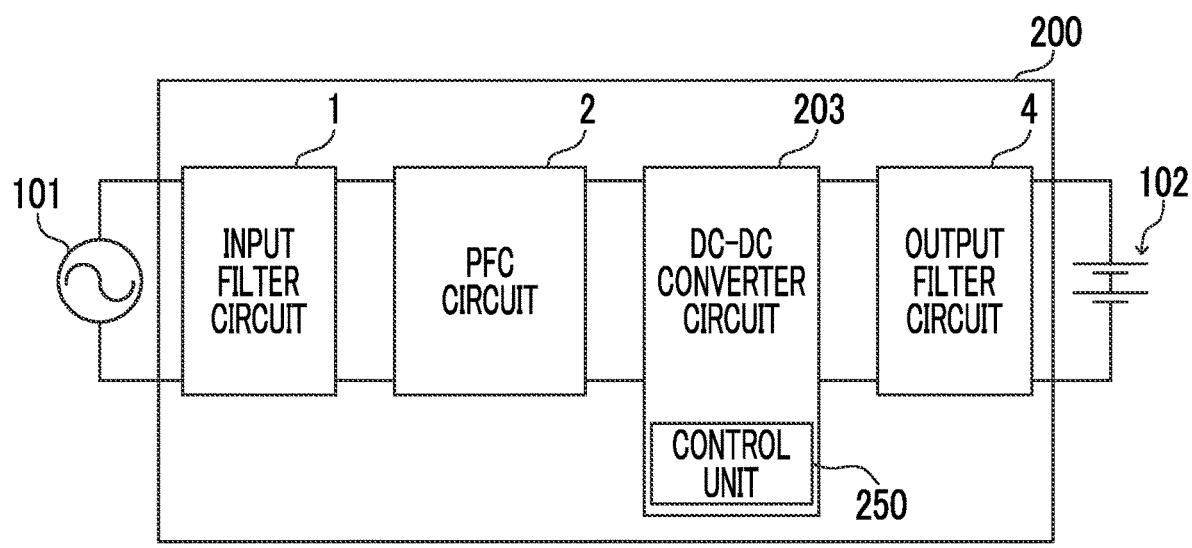
FIG. 11 is a block diagram showing the overall configuration of a power conversion device according to a second embodiment.

As shown in FIG. 11, a power conversion device 200 according to a second embodiment includes a DC-DC converter circuit 203. The DC-DC converter circuit 203 includes a control unit 250. The control unit 250 acquires the command value FB, like the control unit 50 in the power conversion device 100 of the first embodiment. Then, similar to the first embodiment, the control unit 250 switches between phase shift control and frequency modulation control and executes, based on the acquired command value FB. Then, the control unit 250 is configured to execute overlap control, when the command value FB is in the switching command value range of 0.4 or more and 0.5 or less.

Figure 12:
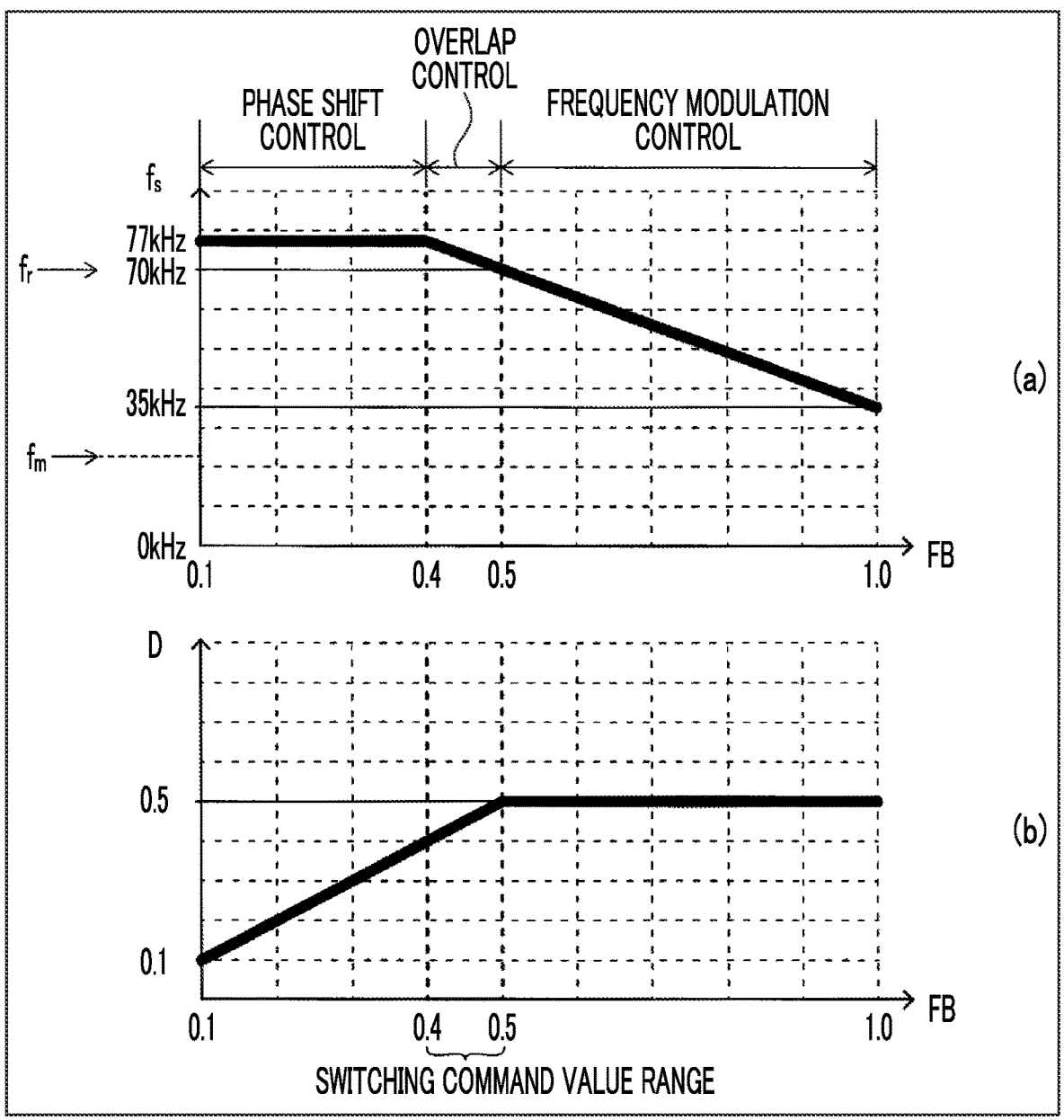
FIG. 12 is a diagram showing the relationship between the command value, the switching frequency, and the phase shift amount according to the second embodiment, where (a) is a diagram for explaining the change in the switching frequency, and (b) is a diagram for explaining the change in the phase shift amount.

As shown in FIG. 12, in the second embodiment, the switching frequency $f_s$ when any one of frequency modulation control, phase shift control, and overlap control is executed is different from the switching frequency $f_s$ in the first embodiment.

Specifically, as shown in (a) of FIG. 12, in the second embodiment, the control unit 250 sets switching frequency $f_s$ when the acquired command value FB is the maximum value in the switching command value range (FB is 0.5) to the resonance frequency $f_r$ (70 kHz) of the resonance circuit 30. Then, when the acquired command value FB is a value within the switching command value range (0.4 or more and 0.5 or less), the control unit 250 is configured to set the switching frequency $f_s$ to a frequency equal to or higher than the resonance frequency $f_r$ (70 kHz) and execute overlap control.

That is, the control unit 250 sets the switching frequency $f_s$ when the command value FB is 0.5 to be the resonance frequency $f_r$ (70 kHz) of the resonance circuit 30, and sets the switching frequency $f_s$ when the command value FB is 0.4 to 77 kHz greater than the resonance frequency $f_r$ (70 kHz). Then, when the command value FB is smaller than 0.4, the control unit 250 performs phase shift control with 77 kHz as the fixed frequency.

Further, when the command value FB is greater than 0.5, the control unit 250 sets the switching frequency $f_s$ to be less than 70 kHz. That is, the control unit 250 performs frequency modulation control such that the switching frequency $f_s$ decreases as the command value FB increases. Then, the control unit 250 sets the switching frequency $f_s$ to 35 kHz, when the command value FB is 1.0. As in the first embodiment, this 35 kHz is set to a value greater than the resonance frequency $f_s$ that is separate from the resonance frequency $f_r$.

In addition, as shown in (b) of FIG. 12, control of the phase difference $DT_s$ (phase shift amount D) by the control unit 250 is performed in the same manner as in the first embodiment. That is, when command value FB is 0.5 or less, phase shift amount D is set to a value equal to the command value FB. When the command value FB is greater than 0.5, the phase shift amount D is set to a constant value of 0.5, and the phase difference $DT_s$ is set to be half the period $T_s$ of the switching operation.

Further, other configurations according to the second embodiment are the same as those of the first embodiment.

Effect of Second Embodiment

In the second embodiment, the following effects can be obtained.

In the second embodiment, as described above, the control unit 250 is configured to set the switching frequency $f_s$ when the acquired command value FB is the maximum value (0.5) of the switching command value range (0.4 or more and 0.5 or less) to be the resonance frequency $f_r$ (70 kHz) of the resonance circuit 30, and when the acquired command value FB is a value within the switching command value range, the control unit 250 is configured to set the switching frequency $f_s$ to a frequency equal to or higher than the resonance frequency $f_r$ and execute overlap control. Thus, since the switching frequency $f_s$ when the command value FB is the maximum value of the switching command value range is set to be the resonance frequency $f_r$, frequency modulation control can be performed by changing the switching frequency $f_s$ with the resonance frequency $f_r$ as the upper limit, in the range of the command value FB greater than the switching command value range. Here, when performing frequency modulation control, the fluctuation of the output voltage is reduced in the frequency range greater than the resonance frequency $f_r$. Therefore, by performing frequency modulation control with the resonance frequency $f_r$ as the upper limit and performing overlap control at frequencies greater than the resonance frequency $f_r$, it is possible to efficiently change the output voltage in a wider frequency range.

Further, the other effects according to the second embodiment are the same as those of the first embodiment.

Modification Example

In addition, the embodiments disclosed here should be considered to be exemplary and not restrictive in all respects. The scope of the present invention is shown not by the description of the above embodiment but by the scope of claims, and further includes all changes (modification examples) within the meaning and scope equivalent to the scope of claims.

For example, in the above-described first and second embodiments, an example is shown in which the predetermined switching operation range (switching command value range) is set as a range in which the command value FB is 0.4 or more and 0.5 or less, but the present invention is not limited to this. In the present invention, a range in which the command value FB is 0.45 or more and 0.5 or less may be set as a predetermined switching operation range (switching command value range). In addition, since the conversion efficiency of the device decreases when the range in which overlap control is executed (predetermined switching operation range) is too large, it is preferable to set the predetermined switching operation range to a range corresponding to about 20% of the frequency range in which the frequency modulation control is executed. That is, it is preferable that the predetermined switching operation range is a range in which the change amount of the command value FB is about 0.1 and the command value FB is 0.4 or more and 0.5 or less.

Further, in the first and second embodiments, an example is shown in which the control unit 50 (250) is configured to perform frequency modulation control by setting the phase difference $DT_s$ constant to half the period $T_s$ of the switching operation, but the present invention is not limited to this. For example, frequency modulation control may be performed by setting the phase difference $DT_s$ to a value smaller than half the period $T_s$ of the switching operation.

Further, in the first and second embodiments, an example is shown in which the control unit 50 (250) is configured to acquire the command value FB, based on the output current value $i_{out}$ from the output converter unit 40, but the present invention is not limited to this. For example, the control unit 50 (250) may be configured to set the command value FB based on the output voltage or output power from the output converter unit 40.

In the first embodiment, an example is shown in which the control unit 50 sets the switching frequency $f_s$ when the acquired command value FB is the minimum value (0.4) in the switching command value range (0.4 or more and 0.5 or less) to be the resonance frequency $f_r$ of the resonance circuit 30, but the present invention is not limited to this. For example, the switching frequency $f_s$ when the command value FB is 0.4 may be set to a frequency lower than the resonance frequency $f_r$. Then, the phase shift control may be performed using a fixed frequency that is lower than the resonance frequency $f_r$.

In the second embodiment, an example is shown in which the control unit 250 sets the switching frequency $f_s$ when the acquired command value FB is the maximum value (0.5) in the switching command value range (0.4 or more and 0.5 or less) to be the resonance frequency $f_r$ of the resonance circuit 30, but the present invention is not limited to this. For example, the switching frequency $f_s$ when the command value FB is 0.5 may be set to a frequency greater than the resonance frequency $f_r$. That is, the magnitude of the switching frequency $f_s$ (fixed frequency) when executing phase shift control may be any magnitude. Note that the fixed frequency is preferably set to a magnitude substantially equal to the resonance frequency $f_r$ in order to improve the conversion efficiency.

Further, in the above-described first and second embodiments, an example is shown in which the power conversion device 100 (200) is a charger (charging device) that outputs DC power for charging the battery 102 mounted on the vehicle, but the present invention is not limited to this. For example, the power conversion device 100 (200) may be configured to be installed stationary in a factory or the like. Further, the power conversion device 100 (200) may be an inverter device including a current resonant DC-DC converter.

Further, in the above-described first and second embodiments, an example in which the resonance frequency $f_r$ is 70 kHz has been shown, but the present invention is not limited to this. For example, the resonance frequency $f_r$ may be 100 kHz. That is, since the configurations of the transformer 20 and the resonance capacitor $C_r$ are changed according to the output voltage and current or the load, the resonance frequency $f_r$ is also changed as appropriate.

Further, examples are shown in which in the first embodiment, the switching frequency $f_s$ when the command value FB is the maximum value (1.0) is set to 28 kHz, and in the second embodiment, the switching frequency $f_s$ when the command value FB is the maximum value (1.0) is set to 35 kHz, but the present invention is not limited to this. The switching frequency $f_s$ (minimum value of the switching frequency $f_s$ in the operation range) at which the command value FB is the maximum value (1.0) may be any value as long as it is set to a frequency greater than the resonance frequency $f_s$ determined by the magnitude of the load, the resonance capacitor $C_r$, the leakage inductance $L_r$, and the exciting inductance $L_m$.

Further, in the first and second embodiments, the switching elements Q1 to Q4 are IGBTs, but the present invention is not limited to this. For example, the switching elements Q1 to Q4 may be MOSFETs.

In the first and second embodiments described above, the inverter unit 10 that outputs AC power is a full-bridge inverter circuit including the switching elements Q1 to Q4, but the present invention is not limited to this. For example, the inverter unit 10 may be a half-bridge inverter circuit.

What is claimed is:

1. A power conversion device comprising:
an inverter unit that includes a switching element and converts input direct current (DC) power to output alternating current (AC) power;
a resonance circuit that includes a resonance capacitor connected in series to an output side of the inverter unit;
a transformer that transforms the AC power that is input from the inverter unit via the resonance circuit and outputs transformed AC power;
an output converter unit that converts the transformed AC power from the transformer into DC power and outputs the DC power; and
a control unit that controls a switching operation of the switching element of the inverter unit, wherein
the control unit is configured to switch between frequency modulation control for changing a switching frequency of the switching element and phase shift control for changing a phase difference in the switching operation of the switching element, based on an output from the output converter unit, and execute, and
when switching between the frequency modulation control and the phase shift control, execute overlap control for executing the phase shift control while executing the frequency modulation control, in a predetermined switching operation range.

2. The power conversion device according to claim 1, wherein
the control unit is configured to switch between executing only the frequency modulation control by setting the phase difference constant and executing only the phase shift control by setting the switching frequency to a constant fixed frequency, and
execute the overlap control, by changing the phase difference while changing the switching frequency, in the predetermined switching operation range.

3. The power conversion device according to claim 1, wherein
the control unit is configured to execute the frequency modulation control by setting the phase difference constant to half a period of the switching operation, and execute the overlap control by changing the switching frequency while changing the phase difference to less than half the period of the switching operation.

4. The power conversion device according to claim 1, wherein
the control unit is configured to acquire a command value for setting the switching frequency and the phase difference, based on the output from the output converter unit, and execute the overlap control as in the predetermined switching operation range, when the command value is a value within a preset switching command value range.

5. The power conversion device according to claim 4, wherein
the control unit is configured to set the switching frequency when the acquired command value is a minimum value of the switching command value range, to be a resonance frequency of the resonance circuit, set the switching frequency to a frequency equal to or lower than the resonance frequency, when the acquired command value is a value within the switching command value range, and execute the overlap control.

6. The power conversion device according to claim 4, wherein
the control unit is configured to set the switching frequency when the acquired command value is a maximum value of the switching command value range, to be a resonance frequency of the resonance circuit, set the switching frequency to a frequency equal to or higher than the resonance frequency, when the acquired command value is a value within the switching command value range, and execute the overlap control.

7. The power conversion device according to claim 1, further comprising:
an input converter unit that converts AC power input from an AC power supply outside the device into DC power, wherein
the inverter unit is configured to convert the DC power from the input converter unit and output AC power,
the output converter unit is configured to output DC power for charging a battery mounted on a vehicle, and the control unit is configured to execute the overlap control, when the DC power is output from the output converter unit to the battery.

8. A control device for a power conversion device including an inverter unit that includes a switching element and converts input direct current (DC) power to output alternating current (AC) power, a resonance circuit that includes a resonance capacitor connected in series to an output side of the inverter unit, a transformer that transforms the AC power that is input from the inverter unit via the resonance circuit and outputs transformed AC power, and an output converter unit that converts the transformed AC power from the transformer into DC power and outputs the DC power, the control device controlling a switching operation of the switching element of the inverter unit, wherein the control device is configured to switch between frequency modulation control for changing a switching frequency of the switching element and phase shift control for changing a phase difference in the switching operation of the switching element, based on an output from the output converter unit, and execute, and when switching between the frequency modulation control and the phase shift control, execute overlap control for executing the phase shift control while executing the frequency modulation control, in a predetermined switching operation range.

9. A power conversion control method in a power conversion device including an inverter unit that includes a switching element and converts input direct current (DC) power to output alternating current (AC) power, a resonance circuit that includes a resonance capacitor connected in series to an output side of the inverter unit, a transformer that transforms the AC power that is input from the inverter unit via the resonance circuit and outputs transformed AC power, an output converter unit that converts the transformed AC power from the transformer into DC power and outputs the DC power, and a control unit that controls a switching operation of the switching element of the inverter unit, the power conversion control method comprising:

a step of measuring an output from the output converter unit; and a step of executing, based on the measured output from the output converter unit, any one of frequency modulation control for changing a switching frequency of the switching element, phase shift control for changing a phase difference in the switching operation of the switching element, and overlap control for executing the phase shift control while executing the frequency modulation control in a predetermined switching operation range.

\* \* \* \* \*